United States Patent
Podolsky et al.

(10) Patent No.: US 12,323,394 B2
(45) Date of Patent: Jun. 3, 2025

(54) REMOTE COMPUTER NETWORK SECURITY TESTING

(71) Applicant: ComplyAuto IP LLC, Salt Lake City, UT (US)

(72) Inventors: David Wesley Podolsky, San Diego, CA (US); Casey Andrew Graff, Sandy, UT (US)

(73) Assignee: ComplyAuto IP LLC, Sandy, UT (US)

( * ) Notice: Subject to any disclaimer, the term of this patent is extended or adjusted under 35 U.S.C. 154(b) by 0 days.

(21) Appl. No.: 18/887,627

(22) Filed: Sep. 17, 2024

(65) Prior Publication Data
US 2025/0112895 A1   Apr. 3, 2025

Related U.S. Application Data

(60) Provisional application No. 63/586,960, filed on Sep. 29, 2023.

(51) Int. Cl.
| | |
|---|---|
| H04L 29/06 | (2006.01) |
| G06F 21/57 | (2013.01) |
| H04L 9/40 | (2022.01) |

(52) U.S. Cl.
CPC ........ H04L 63/0272 (2013.01); G06F 21/577 (2013.01)

(58) Field of Classification Search
None
See application file for complete search history.

(56) References Cited

U.S. PATENT DOCUMENTS

| | | | |
|---|---|---|---|
| 7,346,929 B1 * | 3/2008 | Hammond | G06F 21/552 |
| | | | 713/188 |
| 10,038,711 B1 | 7/2018 | Gorodissky et al. | |
| 10,505,969 B2 | 12/2019 | Gorodissky et al. | |
| 10,534,917 B2 | 1/2020 | Segal | |
| 10,630,501 B2 * | 4/2020 | Ansari | H04L 47/80 |
| 10,686,823 B2 | 6/2020 | Gorodissky et al. | |
| 10,785,264 B2 | 9/2020 | Park et al. | |
| 10,915,638 B2 * | 2/2021 | Czaplewski | G06F 21/577 |

(Continued)

OTHER PUBLICATIONS

"ComplyAuto Penetration Testing Device Attack Phases", ComplyAuto Privacy LLC, 2022, in 3 pages.

(Continued)

*Primary Examiner* — Shin-Hon (Eric) Chen
(74) *Attorney, Agent, or Firm* — Knobbe Martens Olson & Bear LLP

(57) ABSTRACT

Aspects of the present disclosure enable a system with limited computing resources to remotely perform security testing of a large number of host devices. These host devices may be included as part of a single networked computing environment or may be distributed among multiple networked computing environments. The networked computing environments may be associated with a single entity or multiple entities. The system can allocate its limited computing resources among the host devices based on a type of security testing and the amount of host devices to be tested. Further, the system can obtain secure access to the remote networking environment through a secure virtual private network connection to an on-site access system installed at a physical location of the networked computing environment.

23 Claims, 5 Drawing Sheets

(56) References Cited

U.S. PATENT DOCUMENTS

| | | |
|---|---|---|
| 11,206,282 B2 | 12/2021 | Gorodissky et al. |
| 2008/0320548 A1* | 12/2008 | Tripathi ................ G06F 21/552 |
| | | 714/E11.01 |
| 2019/0068631 A1* | 2/2019 | Ashkenazy ............. H04L 41/22 |
| 2020/0134191 A1* | 4/2020 | Strein ................... G06F 21/562 |
| 2022/0201042 A1 | 6/2022 | Crabtree et al. |

OTHER PUBLICATIONS

"ComplyAuto Penetration and Vulnerability Testing Security Q&A", ComplyAuto Privacy LLC, 2022 in 2 pages.

\* cited by examiner

REMOTE COMPUTER NETWORK SECURITY TESTING

INCORPORATION BY REFERENCE

The present application claims priority to U.S. Provisional Application No. 63/586,960, filed on Sep. 29, 2023, the disclosure of which is hereby incorporated by reference in its entirety and for all purposes herein. Any and all applications for which a foreign or domestic priority claim is identified in the Application Data Sheet as filed with the present application are hereby incorporated by reference under 37 CFR 1.57.

BACKGROUND

Computing systems can perform automated security testing of a network. For example, the computing system may act in a manner similar to that of a malicious actor, and attempt to gain unauthorized access to the network being tested, or otherwise interfere in the operations of the network.

SUMMARY

The systems, methods and devices of this disclosure each have several innovative aspects, no single one of which is solely responsible for all of the desirable attributes disclosed herein. Details of one or more implementations of the subject matter described in this specification are set forth in the accompanying drawings and the description below.

In some aspects, the techniques described herein relate to a security testing system configured to implement security testing of a set of host devices in a remote networked environment, the security testing system including: a network interface system configured to establish a communication channel with an access system at the remote networked environment; a plurality of scan processing units configured to implement at least a portion of the security testing of the set of host devices at the remote networked environment; and a control system configured to: receive a request from a computing system to perform security testing of the remote networked environment at a first time; use the network interface system to establish the communication channel with the access system; receive an indication that the access system is available; determine a number of host devices included in the set of host devices; determine a number of pending host devices that are awaiting security testing at the first time, wherein the pending host devices include host devices at one or more remote networked environments that are separate from the remote networked environment; determine an available number of scan processing units from the plurality of scan processing units at the first time; schedule the security testing of the set of host devices at a second time based at least in part on the number of host devices included in the set of host devices, the number of pending host devices, and an availability of a scan processing unit, wherein the second time is later than the first time and includes an estimated start time for security testing the set of host devices; output the estimated start time to the computing system; at the second time, establish a virtual private network connection to the access system, wherein the virtual private network connection provides a scan processing unit of the plurality of scan processing units with access to the set of host devices at the remote networked environment; and initiate the security testing of the set of host devices over the virtual private network connection using the scan processing unit.

In some aspects, the techniques described herein relate to a security testing system, wherein the access system includes a headless client that is connected to network hardware at the remote networked environment.

In some aspects, the techniques described herein relate to a security testing system, wherein the access system includes a special purpose computing system.

In some aspects, the techniques described herein relate to a security testing system, wherein the access system includes a computing system within the remote networked environment configured to execute remote connection software to connect with the security testing system.

In some aspects, the techniques described herein relate to a security testing system, wherein the security testing includes penetration testing, vulnerability testing, misconfigured system testing, attack simulation testing, or any combination thereof.

In some aspects, the techniques described herein relate to a security testing system, wherein the set of host devices includes one or more computing systems, one or more instances of network hardware, one or more printers, one or more internet protocol phones, one or more Internet-of-Things (IOT) devices, or one or more internet protocol manufacturing devices.

In some aspects, the techniques described herein relate to a security testing system, wherein at least one of the plurality of scan processing units includes a graphics processing unit, a central processing unit, a task accelerator, or a virtual machine.

In some aspects, the techniques described herein relate to a security testing system, wherein the computing system is the access system.

In some aspects, the techniques described herein relate to a security testing system, wherein the computing system is a host device at the remote networked environment.

In some aspects, the techniques described herein relate to a security testing system, wherein the computing system is external to the remote networked environment.

In some aspects, the techniques described herein relate to a security testing system, wherein the control system is further configured to determine the number of host devices by causing a scan processing unit of the plurality of scan processing units to perform a network scan of the remote networked environment to identify the number of host devices included in the set of host devices.

In some aspects, the techniques described herein relate to a security testing system, wherein the network scan further includes determining an identity of host type for each of the host devices included in the set of host devices.

In some aspects, the techniques described herein relate to a security testing system, wherein scheduling the security testing of the set of host devices at the second time is further based on a type of the security testing, a priority of the security testing, a priority of the remote networked environment, a priority of an entity associated with the remote networked environment, or an estimated testing time for completing the security testing.

In some aspects, the techniques described herein relate to a security testing system, wherein the control system is further configured to output an estimated completion time for the security testing.

In some aspects, the techniques described herein relate to a security testing system, wherein the virtual private network connection is established by the scan processing unit selected by the control system.

In some aspects, the techniques described herein relate to a security testing system, wherein the control system is further configured to: receive an indication of an available network address at the remote networked environment; and assign the available network address to the scan processing unit.

In some aspects, the techniques described herein relate to a security testing system, wherein the control system is further configured to identify a host device of the set of host devices to be excluded from the security testing.

In some aspects, the techniques described herein relate to a security testing system, wherein the control system is further configured to cause a modification to an operating state of the host device to be excluded from the security testing.

In some aspects, the techniques described herein relate to a security testing system, wherein the control system is further configured to: identify a conflict application executing on a host device of the set of host devices, wherein the conflict application includes an application that interferes with performance of the security testing; and cause a modification in an operating state of the conflict application.

In some aspects, the techniques described herein relate to a security testing system, wherein, in response to the number of host devices included in the set of host devices exceeding a threshold, the control system is further configured to divide the set of host devices into a plurality of subsets of host devices.

In some aspects, the techniques described herein relate to a security testing system, wherein initiating the security testing of the set of host devices includes initiating the security testing of a first subset of host devices of the plurality of subsets of host devices.

In some aspects, the techniques described herein relate to a security testing system, wherein the control system is further configured to initiate security testing of a second subset of host devices of the plurality of subsets of host devices.

In some aspects, the techniques described herein relate to a security testing system, wherein the control system initiates the security testing of the second subset of host devices at a third time that is later than the second time.

In some aspects, the techniques described herein relate to a security testing system, wherein the control system initiates the security testing of the second subset of host devices using the scan processing unit.

In some aspects, the techniques described herein relate to a security testing system, wherein the control system initiates the security testing of the second subset of host devices using a second scan processing unit.

In some aspects, the techniques described herein relate to a computer-implemented method of implementing security testing of a set of host devices in a remote networked environment, the computer-implemented method including: by a security testing system implemented by one or more hardware processors, receiving a request from a computing system to perform security testing of the remote networked environment at a first time; establishing a communication channel with an access system of the remote networked environment; receiving an indication that the access system at the remote networked environment is available; determining a number of host devices included in the set of host devices; determining a number of pending host devices that are awaiting security testing at the first time, wherein the pending host devices include host devices at one or more remote networked environments that are separate from the remote networked environment; determining an available number of scan processing units from a plurality of scan processing units of the security testing system at the first time; scheduling the security testing of the set of host devices at a second time based at least in part on the number of host devices included in the set of host devices, the number of pending host devices, and an availability of a scan processing unit, wherein the second time is later than the first time and includes an estimated start time for security testing the set of host devices; outputting the estimated start time to the computing system; establishing a virtual private network connection to the access system, wherein the virtual private network connection provides a scan processing unit of the plurality of scan processing units with access to the set of host devices at the remote networked environment; and initiating the security testing of the set of host devices over the virtual private network connection using the scan processing unit.

In some aspects, the techniques described herein relate to a computer-implemented method, wherein the virtual private network connection is established at the second time.

In some aspects, the techniques described herein relate to a computer-implemented method, wherein the access system includes a headless client that is connected to network hardware at the remote networked environment.

In some aspects, the techniques described herein relate to a computer-implemented method, wherein the access system includes a special purpose computing system.

In some aspects, the techniques described herein relate to a computer-implemented method, wherein the access system includes a computing system within the remote networked environment configured to execute remote connection software to connect with the security testing system.

In some aspects, the techniques described herein relate to a computer-implemented method, wherein the security testing includes penetration testing, vulnerability testing, misconfigured system testing, attack simulation testing, or any combination thereof.

In some aspects, the techniques described herein relate to a computer-implemented method, wherein the set of host devices includes one or more computing systems, one or more instances of network hardware, one or more printers, one or more internet protocol phones, one or more Internet-of-Things (IOT) devices, or one or more internet protocol manufacturing devices.

In some aspects, the techniques described herein relate to a computer-implemented method, wherein at least one of the plurality of scan processing units includes a graphics processing unit, a central processing unit, a task accelerator, or a virtual machine.

In some aspects, the techniques described herein relate to a computer-implemented method, wherein the computing system is the access system.

In some aspects, the techniques described herein relate to a computer-implemented method, wherein the computing system is a host device at the remote networked environment.

In some aspects, the techniques described herein relate to a computer-implemented method, wherein the computing system is external to the remote networked environment.

In some aspects, the techniques described herein relate to a computer-implemented method, further including determining the number of host devices by causing a scan processing unit of the plurality of scan processing units to perform a network scan of the remote networked environment to identify the number of host devices included in the set of host devices.

In some aspects, the techniques described herein relate to a computer-implemented method, wherein the network scan further includes determining an identity of host type for each of the host devices included in the set of host devices.

In some aspects, the techniques described herein relate to a computer-implemented method, wherein scheduling the security testing of the set of host devices at the second time is further based on a type of the security testing, a priority of the security testing, a priority of the remote networked environment, a priority of an entity associated with the remote networked environment, or an estimated testing time for completing the security testing.

In some aspects, the techniques described herein relate to a computer-implemented method, further including outputting an estimated completion time for the security testing.

In some aspects, the techniques described herein relate to a computer-implemented method, wherein the virtual private network connection is established by the scan processing unit selected by the security testing system.

In some aspects, the techniques described herein relate to a computer-implemented method, further including: receiving an indication of an available network address at the remote networked environment; and assigning the available network address to the scan processing unit.

In some aspects, the techniques described herein relate to a computer-implemented method, further including identifying a host device of the set of host devices to be excluded from the security testing.

In some aspects, the techniques described herein relate to a computer-implemented method, further including causing a modification to an operating state of the host device to be excluded from the security testing.

In some aspects, the techniques described herein relate to a computer-implemented method, further including: identifying a conflict application executing on a host device of the set of host devices, wherein the conflict application includes an application that interferes with performance of the security testing; and causing a modification in an operating state of the conflict application.

In some aspects, the techniques described herein relate to a computer-implemented method, further including, in response to the number of host devices included in the set of host devices exceeding a threshold, dividing the set of host devices into a plurality of subsets of host devices.

In some aspects, the techniques described herein relate to a computer-implemented method, wherein initiating the security testing of the set of host devices includes initiating the security testing of a first subset of host devices of the plurality of subsets of host devices.

In some aspects, the techniques described herein relate to a computer-implemented method, further including initiating security testing of a second subset of host devices of the plurality of subsets of host devices.

In some aspects, the techniques described herein relate to a computer-implemented method, wherein initiating the security testing of the second subset of host devices includes initiating the security testing of the second subset of host devices at a third time that is later than the second time.

In some aspects, the techniques described herein relate to a computer-implemented method, wherein initiating the security testing of the second subset of host devices includes initiating the security testing of the second subset of host devices using the scan processing unit.

In some aspects, the techniques described herein relate to a computer-implemented method, wherein initiating the security testing of the second subset of host devices includes initiating the security testing of the second subset of host devices using a second scan processing unit.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure. To easily identify the discussion of any particular element or act, the most significant digit(s) in a reference number typically refers to the figure number in which that element is first introduced.

DETAILED DESCRIPTION

Figure 1:
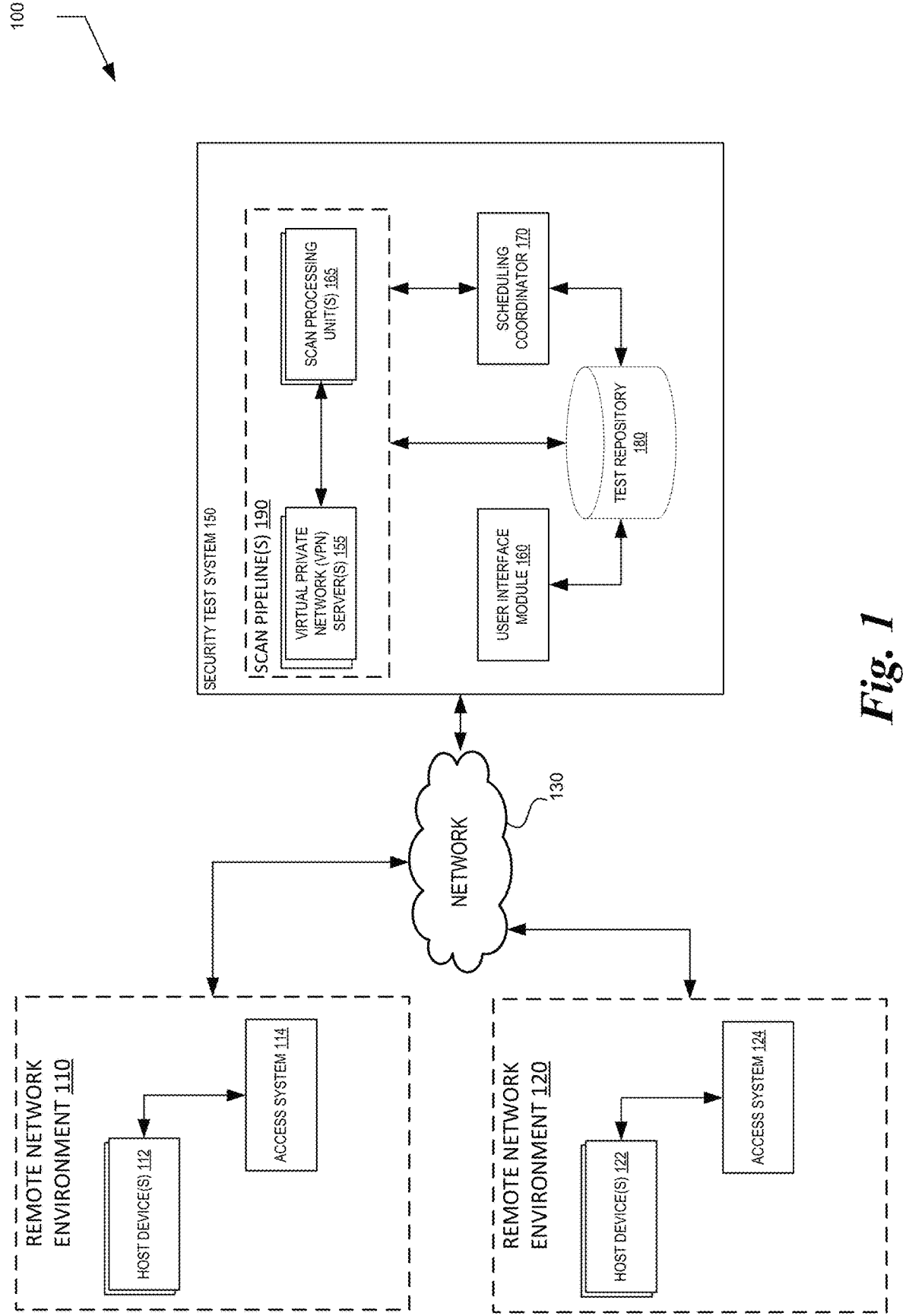
FIG. 1 is a block diagram of illustrative data flows within a system implementing remote security testing according to some embodiments.

The present disclosure relates to security testing of a networked computing environment by a remote security test system that is at least partially remote from the networked computing environment.

Some systems allow for security testing of a networked computing environment using a mobile computing system operated by a security tester. The security tester in such systems may bring the mobile computing system to the physical location where the networked computing environment is operated. The security tester may then connect the mobile computing system to a network device (e.g., a network switch, a router, etc.) to gain access to the networked computing environment. When the mobile computing system is connected to the network device, security testing software operating on the mobile computing system performs security testing of the networked computing environment. Such systems may incur high costs, both in terms of money and time, due to the need to have a security tester physically present at a networked computing environment to perform security testing. Additionally, such systems may not be suitable for use by operators of networked computing environments in certain locations, for example where it would be challenging to find a security tester able to reach the location necessary to perform security testing of the networked computing environment and/or when the network computing environment is distributed among several disparate physical locations.

Some systems may perform remote security testing of a networked computing environment. Some such systems may use a virtual private network (VPN) connection that can be established between the networked computing environment and a computing system of the security test system through a VPN provider. The use of a VPN provider may present additional security issues. For example, the VPN provider may not adequately maintain security of the VPN service, offering an additional attack vector for accessing the networked computing environment or the security testing system.

Aspects of the present disclosure enable a system with limited computing resources to remotely security test a large number of host devices. These host devices may be included as part of a single networked computing environment or may be distributed among multiple networked computing environments. The networked computing environments may be associated with a single entity or multiple entities. The system can allocate its limited computing resources among the host devices based on a type of security testing and the amount of host devices to be tested. Further, the system can obtain secure access to the remote networking environment through a secure virtual private network connection to an on-site access system installed at a physical location of the networked computing environment.

Some aspects of the present disclosure provide for a remote security testing system configured to provide a VPN connection between the security test system and the networked computing environment without the use of a third-party VPN provider. For example, the VPN server may be integrated into the security test system, such that it is under control of the operator of the security test system. Additionally, integrating the VPN server into the security test system may reduce a security risk to the security test system caused by a delay or failure in updating computing systems in response to newly identified security vulnerabilities, by allowing for a single update to protect all aspects of the security test system and minimizing potential attack vectors related to the security test system.

In some embodiments, a security test system is operated by a security test operator, and an access system is provided to a client of the security test operator to be connected to the client's networked computing environment (e.g., the remote networked computing environment). A security testing process may begin in response to a request to perform security testing (e.g., penetration testing, vulnerability scanning, etc.) of a remote networked computing environment being received by a security test system. For example, the request may be received from an access system of the remote networked computing environment. The request may be generated by the access system based on an identified potential security vulnerability (e.g., a vulnerability alert received by the access system from an automated security alert system), a time at which security testing is designated to occur (e.g., annually as part of a compliance program), or any other indication the remote networked computing environment may require security testing. The request may include an indication of a time at which the security testing is requested to be performed.

When the request to initiate security testing is received, the security test system may initiate a connection between the security test system and the access system. The access system or the security test system may determine a number of host devices connected to the remote networked computing environment. The count of the number of host devices may be used, in part, to schedule security testing of the remote networked computing environment. For example, a length of time of security testing may be determined by a scheduling coordinator of the security test system based at least in part on the number of host devices connected to the remote networked computing environment. Additionally, a type of host device may be determined by the security test system for at least one of the host devices connected to the remote networked computing environment. Identifying the type of a host device may be useful for determining whether normal operation of the host device could interfere with security testing. For example, a router running a firewall may prevent the access needed to perform some types of security testing. In some cases, in response to determining that a device such as the router may interfere with the security testing, the security test system may modify a configuration or operating state of the device to avoid interference with security testing. Additionally, some types of host devices may need to be place in an altered state (e.g., a safe mode, or turned off) for security testing to avoid causing a malfunction of the host device.

In some embodiments, there may be a limit to the number of host devices which can undergo security testing at a particular time. The security test system may divide the host devices into a plurality of sets of host devices, each set of host devices being less than the limit of host devices which can undergo security testing. The limit may be based, for example, on computing resources available at the security test system, restrictions on a number of host systems that can be removed from operation during testing (e.g., a network or network operator may require or desire that a percentage of hosts remain operational at any given time), on a license requirement of security testing software, a timeframe within which security testing is to occur, or any other reason which may limit the number of host devices that can undergo testing at a particular time instance. The security test system may perform security testing on each set of host devices, serially or at least partly in parallel, until all host devices have been tested. The results of the scan of each set of host devices may be combined such that the security test system outputs a single security testing result.

Various aspects of the disclosure will be described with regard to certain examples and embodiments, which are intended to illustrate but not limit the disclosure. Although aspects of some embodiments described in the disclosure will focus, for the purpose of illustration, on particular examples of security testing, device types, and the like, the examples are illustrative only and are not intended to be limiting. In some embodiments, the techniques described herein may be applied to additional or alternative types of security testing, device types, and the like. Additionally, any feature used in any embodiment described herein may be used in any combination with any other feature or in any other embodiment, without limitation.

Example Security Testing Environment

With reference to an illustrative example, FIG. 1 shows an example computing environment 100 implementing remote security testing. The computing environment 100 may include a remote network environment 110, a remote network environment 120, a network 130, and a security test system 150. Although two remote network environments are illustrated and described, it should be understood that the computing environment 100 may include more or fewer remote network environments. Further, the remote network environment 110 and remote network environment 120 may each represent one physical location. Alternatively, the remote network environment 110 and the remote network environment 120 may each represent several physical locations that include one or more computing devices (e.g., host devices) distributed among the several physical locations. These host devices may each be communicatively coupled as part of a single network. In some cases, the remote network environment 110 and the remote network environment 120 represent two physical locations of an entity (e.g., a car dealership, a law firm, a software development company, etc.). Where two or more network environments are controlled by a single entity, a single access system (e.g., access system 114) may be in communication with both the remote network environment 110 and the remote network environment 120. In some such cases, the remote network environments may otherwise be isolated such that network traffic of one remote network environment is not communicated to a second remote network environment, except, in some cases, by the network 130. The remote network environment 110 and the remote network environment 120 may each include separate computing networks formed from the host devices. Alternatively, the host devices of the remote network environment 110 and the remote network environment 120 may form a single computing network.

The remote network environment 110 may be a network computing environment associated with a first entity. This first entity may be the same entity as or a separate entity from the entity associated with the security test system 150. The remote network environment 110 may include at least one host device 112, and an access system 114. A host device 112 may be, for example, a network switch, router, personal computing device, smartphone, printer, scanner, web camera, an Internet-of-Things (IoT) device, an internet protocol phone, an internet protocol manufacturing device, or any other computing device that can connect to or interact over a network, such as but not limited to the Internet. The access system 114 may be a special purpose device (e.g., an application-specific integrated circuit, a field-programmable gate array, etc.), headless client, or software operating on a computing device of the remote network environment 110, connected to the network of the remote network environment 110. Alternatively, or in addition, the access system 114 may be implemented using general-purpose hardware or single-board computers, such as Raspberry Pi®. In some cases, the access system 114 may maintain a continuous connection with the security test system 150, for example to report a status of the access system 114 and/or the remote network environment 110. In other cases, the access system 114 may establish communication with the security test system 150 in response to an interaction with a user interface indicating a desire to initiate security testing of the host device 112. In some cases, the access system 114 may automatically establish communication with the security test system 150 in response to a trigger, such as a scheduled testing event. Additionally, the access system 114 is configured to enable secure network access for the security test system 150, allowing the security test system 150 to perform security testing of the first remote network environment 110. Further, the access system 114 may be configured to determine a number of host devices connected to the network of the first remote network environment 110. The entity associated with the first remote network environment 110 may request that the security test system 150 perform security-related testing of the one or more host devices 112 of the first remote network environment 110. Alternatively, or in addition, a computing system (e.g., the access system 114 or a host device 112) of the first remote network environment 110 may automatically request security-related testing of the host devices 112.

The remote network environment 120 may be a network computing environment associated with a second entity. The second entity may be a different entity from the first entity associated with the remote network environment 110. In some embodiments, the remote network environment 120 may be under control of a same entity as the remote network environment 110. For example, the remote network environment 110 and the remote network environment 120 may be separate car dealerships owned by a common owner, that may maintain each networked computing environment separately. The remote network environment 120 may undergo security testing as described in relation to the remote network environment 110. The remote network environment 120 may be in a location different from the remote network environment 110. In some embodiments, the remote network environment 120 and remote network environment 110 may be collocated but logically isolated. remote network environment 120 remote network environment 110 remote network environment 110 remote network environment 120 The remote network environment 120 may include at least one host device 122, and an access system 124. A host device 122 may be, for example, a network switch, router, personal computing device, smartphone, printer, scanner, web camera, an Internet-of-Things (IoT) device or any other computing device that can connect to or interact over a network, such as but not limited to the Internet, or network 130 described previously herein. In some cases, the access system 124 may be a software component or hardware device connected to the network of the remote network environment 120, as described herein with respect to the access system 114. In other cases, the access system 114 may establish communication with the security test system 150 in response to an interaction with a user interface indicating a desire to initiate security testing of the host device 112. In some cases, the access system 114 may automatically establish communication with the security test system 150 in response to a trigger, such as a scheduled testing event. The access system 124 associated with the remote network environment 120 may request that the security test system 150 perform security-related testing of the one or more host devices 122 of the remote network environment 120. Alternatively, or in addition, a computing system (e.g., the access system 124 or a host device 122) of the remote network environment 120 may automatically request security-related testing of the host devices 122.

The security test system 150 may include one or more computing systems configured to connect to a remote networked computing environment and perform security testing of host devices of the remote network of the remote networked computing environment (e.g., the remote network environment 110). The security test system 150 may include a user interface module 160, at least one scan pipeline 190, a scheduling coordinator 170, and a test repository 180.

The user interface module 160 is configured to enable user interaction with the security test system 150. For example, the user interface module 160 may provide for a browser-based interface allowing customers of a security testing service to request security testing, indicate a desired type of security testing, provide one or more internet protocol (IP) addresses of the remote network environment, request results of a security test, view results of a security test, and/or provide or view any other information relevant to security testing of the client's remote networked computing environment. Additionally, the user interface module 160 may allow for interaction between a controller of the security test system 150 and the security test system 150, for example to update the available security testing software. Instructions or requests received by the user interface module 160 may be stored in the test repository 180 for access and use by other elements of the security test system 150.

The at least one scan pipeline 190 may include at least one virtual private network server 155 and at least one scan processing unit 165. The scan processing unit 165 of a scan pipeline 190 may be associated with a virtual private network server 155 in a one-to-one correspondence. The scan processing unit 165 may use the associated virtual private network server 155 to create a secure connection to an access system (e.g., access system 114). The security test system 150 may comprise any number of scan pipelines 190, each with a scan processing unit 165 and associated virtual private network server 155.

The virtual private network server 155 is configured to enable a virtual private network (VPN) connection between the security test system 150 and a remote networked computing environment where security testing is to be performed. Advantageously, providing the virtual private network server 155 as part of the security test system 150 may reduce vulnerabilities in security testing by minimizing the computing systems involved in connecting the at least one scan processing unit 165 to the remote networked computing environment. Additionally, in certain embodiments, by providing the virtual private network server 155 as part of the security test system 150, the risk of an unavailable VPN provider interfering with scheduling of security testing, or a VPN connection not providing sufficient bandwidth for security testing, is reduced or eliminated.

In some embodiments, the virtual private network server 155 may assign an IP address associated with a remote network environment (e.g., remote network environment 110) to the security test system 150 so that it may access the remote networked computing environment. Alternatively, the virtual private network server 155 may establish a reverse proxy connection between an access device and the security test system 150. Advantageously, using a reverse proxy may reduce the complexity associated with assigning an IP address to the security test system 150 when performing security testing of a plurality of remote network environments by allowing the security test system 150 to connect to each remote networked computing environment being tested and act as a passthrough for a scan processing unit performing the security testing.

The scan processing units 165 can include any device or system that can be configured to implement security testing of one or more host devices 112. For example, the scan processing units 165 may include a graphics processing unit (GPU), a central processing unit (CPU), accelerated processing unit (APU), a task accelerator, a field programmable gate array (FPGA), special purpose device configured for security testing, a virtual machine, or any other system capable of security testing a host device 112. Security testing by the scan processing units 165 may include penetration testing, vulnerability scanning, risk assessment, security code review, misconfigured system testing, attack simulation testing, and/or any other type of security analysis performed on a networked computing environment or host device.

The scheduling coordinator 170 is configured to manage the scheduling of security testing for remote networked computing environments. The scheduling coordinator 170 may manage requests for security testing received via the user interface module 160. The requests may be accessed by the scheduling coordinator 170 from the test repository 180 where they are stored by the user interface module 160. Based on a current number of planned and/or ongoing security testing instances, the scheduling coordinator 170 may estimate a start time for security tests of a remote networked computing environment. Estimating a start time for security testing by the scheduling coordinator 170 may additionally be based on an available number of scan processing units, a security test type, a security testing priority associated with the remote networked environment, a security testing priority associated with the security test type, a number of security tests to be performed on the remote networked environment, and/or the security test type. Additionally, the scheduling coordinator 170 may estimate an end time of a security test. The scheduling coordinator 170 may estimate the end time of a security test, for example, based on a number of host devices connected to a remote networked computing environment, an actual start time of security testing of the remote networked computing environment, an IP range of the remote networked computing environment, a processing capacity of at least one scan processing unit 165, and/or a security testing type to be performed. Additionally, the scheduling coordinator 170 may be configured to report an estimated start time, an actual start time, and/or an end time associated with security testing to a user (e.g., an owner of the remote network environment 110), for example via a user interface managed by the user interface module 160.

The test repository 180 may include any type of repository or database configured to store security testing results received from at least one scan processing unit 165 for each remote networked environment which undergoes security testing. Further, the test repository 180 may include instructions and/or test software for implementing one or more security testing processes for testing the security of the host devices 112. Additionally, the test repository 180 may be used to store requests for security testing received by the user interface module 160 for access by other elements of the security test system 150. For example, the scheduling coordinator 170 may access a request stored by the user interface module 160 in the test repository 180 to perform scheduling of security testing.

The network 130 may include any type of communications network including a wired network, a wireless network, a cellular network, a local area network ("LAN"), a wireless area network ("WAN"), and the like. Further, in some embodiments, the network 130 may be or may include the Internet. In some embodiments, the various components of the computing environment 100 may, in various implementations, communicate with one another directly or indirectly via any appropriate communications links (e.g., one or more communications links, one or more computer networks, one or more wired or wireless connections, the Internet, any combination of the foregoing, and/or the like).

Example Security Testing Scheduling Process

Figure 5:
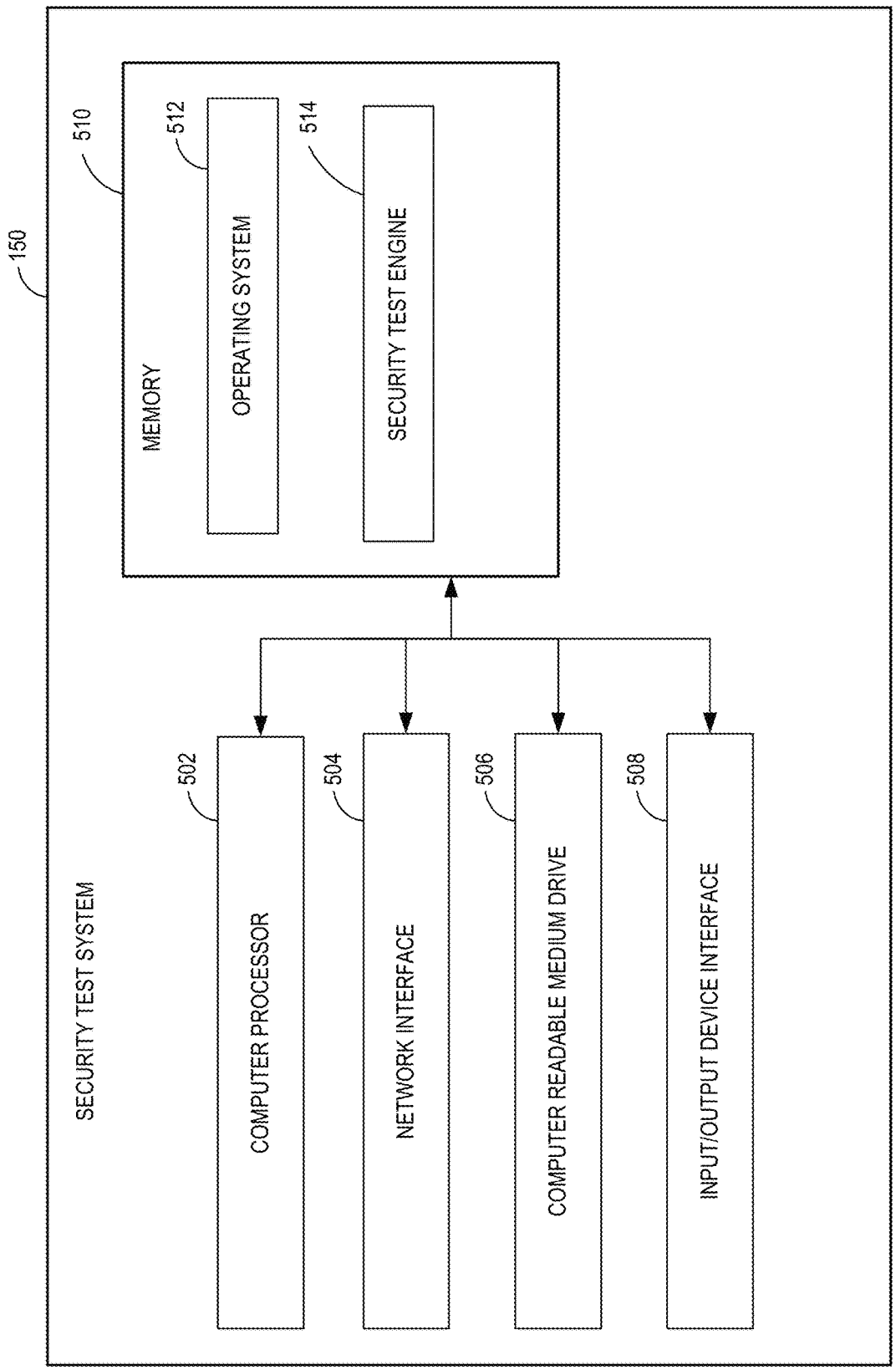
FIG. 5 is a block diagram of an illustrative computing system configured to provide remote security testing according to some embodiments.

When a process is initiated, a set of executable program instructions stored on one or more non-transitory computer-readable media (e.g., hard drive, flash memory, removable media, etc.) may be loaded into memory (e.g., random access memory or RAM) of a computing system, such as the security test system 150 shown in FIG. 5, and executed by one or more processors. In some embodiments, the routines or portions thereof may be implemented on multiple processors, serially or in parallel.

Figure 2:
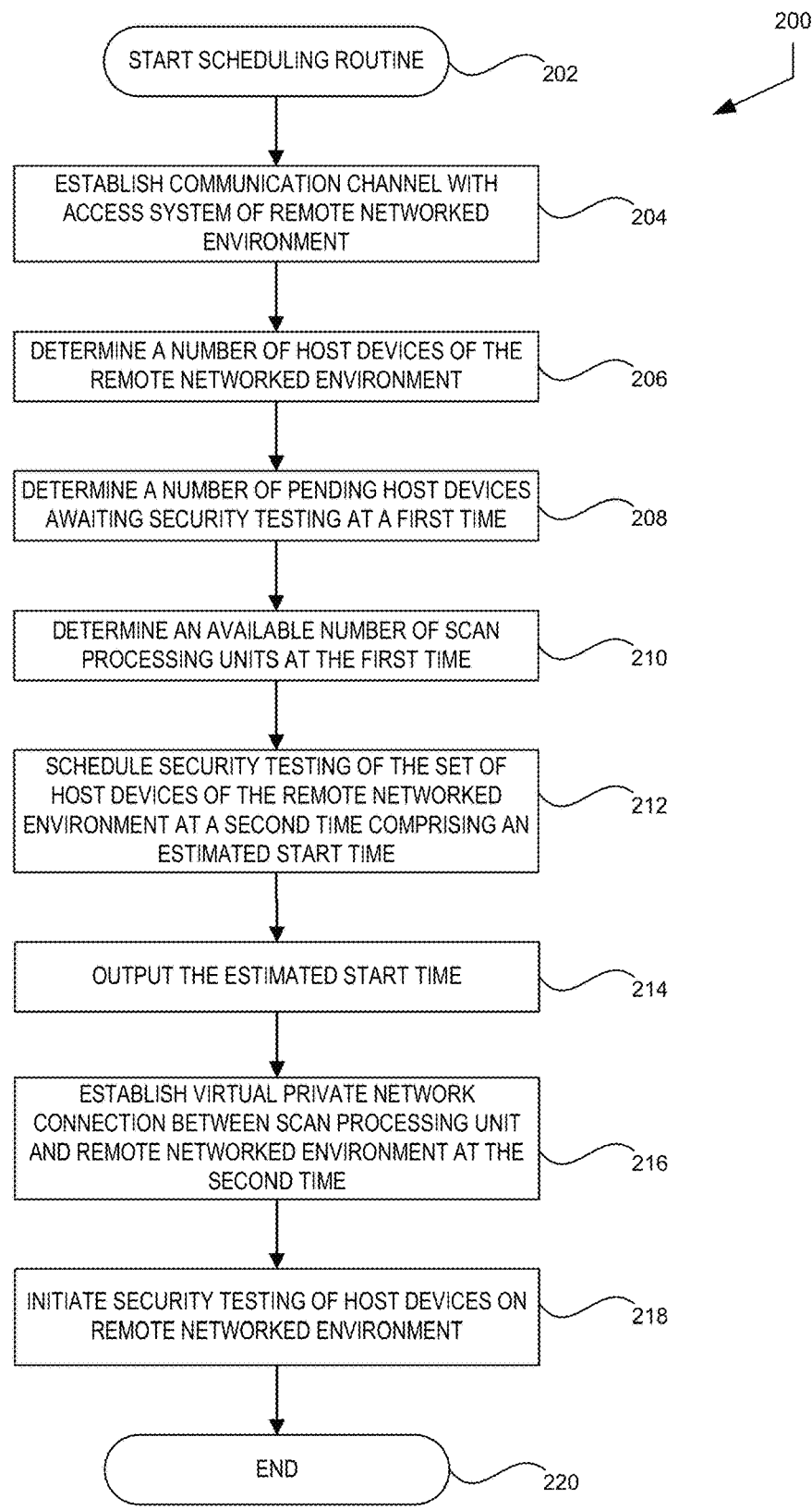
FIG. 2 is a flow diagram of an illustrative routing for scheduling security testing according to some embodiments.

FIG. 2 illustrates an example process 200 for scheduling security testing of a remote networked computing environment. The process 200 can be implemented by any system that is configured to schedule and/or implement security testing of a set of computing systems or host systems of a remote networked computing environment (e.g., remote network environment 110). The process 200, in whole or in part, can be implemented, for example, by the security test system 150, virtual private network server 155, scheduling coordinator 170, and the like. Although any number of systems, in whole or in part, can implement process 200, to simplify discussion the process 200 will be described with respect to particular systems.

The process 200 begins at block 202. For example, the process 200 may begin in response to the security test system 150 receiving a request to perform security testing at a first time. The request may be automatically generated by the access system 114 of the remote network environment 110 at fixed intervals (e.g., monthly, quarterly, biannually, annually, etc.). Alternatively, the request may be received from a computing system associated with a networked computing environment. Further, the request may be received in response to an interaction with a user interface managed by the user interface module 160. In some cases, the computing system may be external to the remote networked environment. For example, a user may initiate scheduling of the security testing via a personal computing device (e.g., a smartphone or laptop) that may or may not be part of the remote networked computing environment.

At block 204, the security test system 150 establishes a communication channel with an access system (e.g., access system 114 or access system 124) of a remote networked computing environment. The security test system 150 may establish the communication channel via the network 130, and the communication channel may be an encrypted communication channel. In some cases, the security test system 150 initiates establishing the communication channel with the access system 114. For example, in response to receiving a request to scheduling security testing from a user computing device, the security test system 150 may use address or connection information (e.g., IP address, MAC address, username and password, etc.) included in the request, or previously provided, to obtain access to the access system 114 at the remote network environment 110. In other cases, the access system 114 may initiate establishing the communication channel with the security test system 150.

The communication channel may be used to facilitate communication between the security test system 150 and an access system to allow the security test system 150 to obtain information or metadata associated with the remote network computing environment that may be used to facilitate scheduling or conducting the security testing. This metadata may include any type of data that can facilitate the security testing. For example, the metadata may include a set of IP addresses associated with the remote networked computing environment, a type of one or more host devices at the remote networked computing environment, a network bandwidth, operating system versions executing on the one or more host devices, the existence or type of firewall maintained by the remote computing network, and the like. In some embodiments, the communication channel may exist between the access system and the security test system 150 before the first time. In some such cases, the block 204 may include verifying the communication channel (e.g., by the security test system 150 sending a test message to the access system). Additionally, the access system or the security test system 150 may map the remote networked computing environment by determining a number of host devices connected to the remote networked computing environment.

At block 206, the security test system 150 and/or the access system determines a number of host devices of the remote networked computing environment. In some embodiments, the number of host devices may be an estimate. For example, the access system associated with the remote networked computing environment may provide a range of IP addresses to be tested during the security testing to the security test system 150 via the communication channel. Alternatively, network scanning software may determine the number of host devices. For example, network scanning software may be installed on the access system or on the security test system 150. The network scanning software may then conduct host discovery on the remote networked computing environment, for example by transmitting packets over the remote network and analyzing the responses received. Additionally, in some embodiments the security test system 150 or the access system may characterize the host devices detected on the remote networked computing environment, for example by determining a host device type or identity of the host type.

At block 208, the scheduling coordinator 170 determines a number of pending host devices awaiting security testing at the first time. The number of pending host devices awaiting security testing may be associated with one or more different remote networked computing environments that may be separate from the remote networked computing environment requesting security testing at the first time. For example, if the remote network environment 110 requests security testing at the first time, the number of pending host devices awaiting security testing at the first time may be the number of host devices of the remote network environment 120. Additionally, when the number of host devices of a remote network environment is determined, the scheduling coordinator 170 may update a queue of requests to perform security testing, such that an estimated start time for one or more requests in the queue is updated based on the determined number of host devices of the remote network.

At block 210, the security test system 150 determines a number of available scan processing units at the first time, for example the at least one scan processing unit 165. Available scan processing units may include scan processing units configured to perform a security testing type (e.g., vulnerability scan, or penetration testing) included in the request which are currently not performing security testing of a different remote networked computing environment, not currently scheduled to perform security testing, functioning at the first time, configured to perform the type of security testing requested at the first time, or otherwise capable of performing the requested security testing at the first time. In some instances, no scan processing units will be available at the first time.

At block 212, the scheduling coordinator 170 schedules security testing of the set of host devices identified from the remote networked computing environment requesting security testing at the first time, at a second time later than the first time and indicating an estimated start time. The scheduling coordinator 170 may determine the second time based on the number of host devices of the remote networked computing environment, the number of available scan processing units, the estimated time when a scan processing unit configured to perform the security testing type requested at the first time is expected to become available, a requested start time indicated in the received request to perform the security testing, and/or the security testing type requested.

As part of scheduling the security testing of the host devices of the remote networked computing environment, an estimated end time, or length of time for which security testing is expected to occur, may be determined by the scheduling coordinator 170. The scheduling coordinator 170 may estimate the end time based on a number of host devices to be scanned as part of the security testing, a type of security testing to be performed, a type of scan processing unit expected to be available at the second time, host device types of the host devices to be scanned as part of security testing, a connection type between the security test system 150 and the remote networked computing environment, and/or a number of scan processing units expected to be available to perform security testing.

At block 214, the security test system 150 outputs the estimated start time is output. For example, the user interface module 160 may provide an estimated start time to a system associated with the remote networked computing environment via a user interface. The example user interface may be accessible using a web browser, or by connecting to the access system (e.g., physically connecting input and/or output devices to the access system, or accessing the access system from a computing device of the remote networked computing environment). Additionally, the scheduling coordinator 170 may provide the estimated start time may be provided to additional elements of the security test system 150 to indicate a time when, for example, a scan processing unit should be instructed to initiate security testing of the remote networked computing environment.

At block 216, the virtual private network server 155 establishes a VPN connection between the scan processing unit of the security test system 150 assigned to conduct the security testing and the remote networked computing environment to undergo security testing. The VPN connection is established at the second time. The VPN connection may be established by the virtual private network server 155 of the security test system 150 connecting to the access system of the remote networked computing environment. Establishing the VPN connection is described in additional detail in relation to FIG. 3.

Additionally, when the VPN connection is established, the security test system 150 may generate a network map indicating at number of host devices connected to the remote networked computing environment. The number of host devices may be determined based on an IP range provided to the security test system 150, for example via the access system associated with the remote networked computing environment or the access system. Alternatively, access system and/or the security test system 150 may run a network mapping software to determine the number of host devices, where the network mapping software is configured to transmit packets to devices of the remote networked computing environment and determine at least a host device connection based on a response received. Additionally, a host device type may be determined as part of the network mapping. The host device type may be used by the security test system 150 to provide a notification to a user associated with the remote networked computing environment that one or more host devices should be placed in an altered state before security testing begins at the second time. For example, a host device may be identified as a printer, and a user may be informed via a computing device that printer paper should be removed from the printer prior to the start of security testing to avoid accidental printing. Alternatively, the access system or the security test system 150 may provide commands to a host device to enter an altered state prior to the start of security testing. For example, the access system may transmit a command to a printer to shut down. As part of determining a number of host devices connected to the remote networked computing environment, a determination of a conflict application (e.g., security software) operating on the remote networked computing environment may also be made. For example, it may be determined that a firewall setting of the remote network may impact the ability to perform the security testing, and a user may be instructed to alter settings of the firewall software to allow security testing to proceed.

At block 218 the security test system 150 initiates security testing of host devices on the remote networked computing environment by at least one scan processing unit 165. Initiating security testing may include the security test system 150 selecting at least one scan processing unit to perform the security testing. When the security testing of host devices on the remote networked computing environment has been initiated, the process 200 moves to block 220 and ends.

Prior to scheduling the security testing of a remote networked computing environment, such as when the user interface module 160 receives a new request to perform security testing, a queue update process may occur, for example the scheduling coordinator 170 may perform a queueing process. The queuing process may be implemented by the scheduling coordinator 170 to dynamically determine a next security testing to be performed by a next available scan pipeline 190 of the security test system 150. Additionally, the scheduling coordinator 170 may perform the queueing process in response to security testing of a remote networked computing environment beginning.

The scheduling coordinator 170 may determine a set of currently pending security tests to be performed. The set of currently pending security tests may include additional security testing previously requested for a same remote networked computing environment as a newly received request. For example, a vulnerability scan may have been requested for the remote networked computing environment previously, and the current request may be for a penetration test of the remote networked computing environment. The set of currently pending tests may additionally include security testing requests received for remote networked computing environments not associated with the remote networked computing environment of the newly received request.

The scheduling coordinator 170 may order the currently pending security requests and the newly received request in a queue. The order of the queue may be based on a time when the request for security testing was received. For example, a first request received at a first time may be placed in the queue by the scheduling coordinator 170 before a second request received at a second time, where the second time is after the first time. The first request being placed in the queue before the second request then causes the scheduling coordinator 170 to begin security testing of the remote networked computing environment associated with the first request before beginning testing of the remote networked computing environment associated with the second request.

The scheduling coordinator 170 may consider additional information when placing requests in the queue. For example, a customer associated with a remote networked environment may be given a priority status. Further, a type of testing may be given a priority status. Additionally, the user interface module 160 may receive an instruction to prioritize a request for security testing. When a request is given priority, the scheduling coordinator 170 may place the prioritized request at a point in the queue where the prioritized request will receive a start time earlier than a request received earlier in time without a priority indication. Additionally, the scheduling coordinator 170 may place a pre-scheduled test in the queue such that the pre-scheduled security test (e.g., an annual security test) occurs as close to possible to a time associated with the pre-scheduled test.

In some embodiments, at least one scan pipeline 190 may be associated with performing security testing outside of the queue. For example, a scan pipeline 190 may be configured to perform a specialized security testing separate from the security testing performed by scan pipelines associated with the queue. Alternatively, a scan pipeline 190 may be reserved for high priority remote networked environments. For example, where a remote networked environment is already believed to have a security vulnerability, a scan pipeline 190 may be reserved for immediate security testing to minimize disruption of the existing queue. The scheduling coordinator 170 may identify requests associated with high priority security testing, or specialized security testing, and direct the request to the reserved scan pipeline, or a second queue associated with the reserved scan pipeline instead of the queue.

The scheduling coordinator 170 may generate a queue time estimate based on the queue. The queue time estimate may be based on a potential number of devices to be scanned for one or more requests in the queue (e.g., based on an IP range received as part of the request), an actual number of devices to be scanned for one or more requests in the queue (e.g., based on an actual determination of the number of hosts associated with request), a number of requests in the queue, a security testing type associated with a request in the queue, or other information available to the scheduling coordinator 170 indicating a length of time for completing security scanning associated with one or more requests in the queue. The queue time estimate may be updated at any time including when a new request is received, when a security test associated with a request in the queue begins, or when a number of host devices of a network associated with a request in the queue is determined.

In some cases, an estimate of start time for testing host devices 112 of a remote network environment 110 that is in the queue may be updated when testing of another the remote network environment 120 that is previously queued is initiated. This adjustment in start time for testing host devices 112 of the remote network environment 110 may be based on a determination of the number of host devices included in the remote network environment 120. Further, the scheduling coordinator 170 may estimate an end time for testing the host devices 112 of the remote network environment 110. This end time may be estimated upon the remote network environment 110 being assigned to a scan pipeline 190 for testing after queuing of the remote network environment 110 has completed. The scheduling coordinator 170 may estimate the end time for testing the remote network environment 110 based on a determined number of host devices 112 included in the remote network environment 110, the type of tests to be performed, or any other factor that may affect the completion of security testing of the remote network environment 110.

Example Host-Client Connection Process

Figure 3:
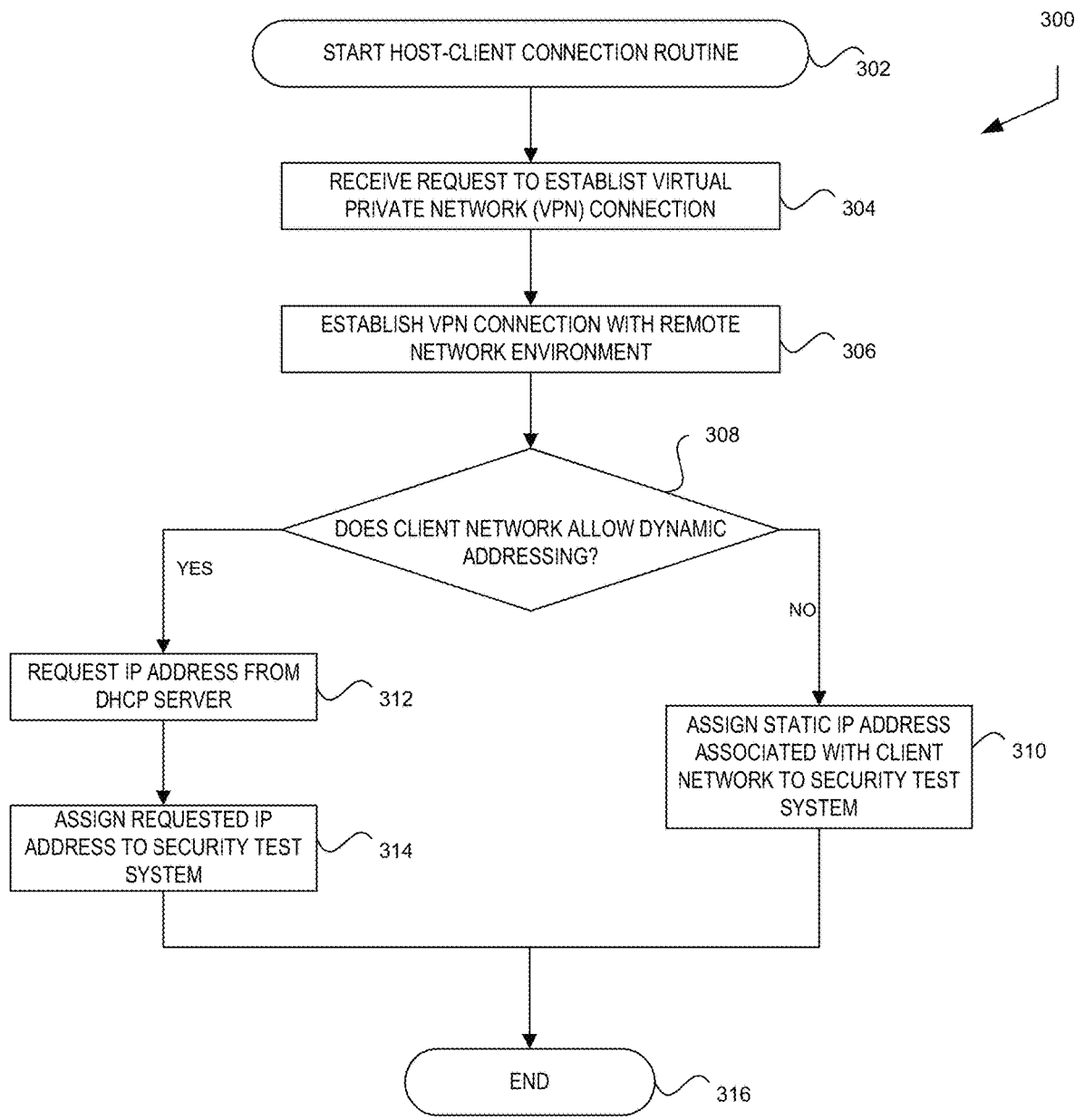
FIG. 3 is a flow diagram of an illustrative routine for initiating a secure connection between a security test system and an access system according to some embodiments.

FIG. 3 illustrates an example process 300 for initiating a host-client connection between the security test system 150 and a remote networked computing environment (e.g., remote network environment 110). The process 300 can be implemented by any system configured to generate a host-client connection including a virtual private network to allow access to a remote networked computing environment for a security test system 150. The process 300, in whole or in part, can be implemented by, for example, the security test system 150, the virtual private network server 155, and the like. Although any number of systems, in whole or in part, can implement the process 300, to simplify discussion the process 300 will be described with respect to particular systems.

The process 300 begins at block 302, for example in response to the second time indicating the estimated start time of security testing being reached. Alternatively, the process 300 may begin in response to the security test system 150 receiving an indication that security testing is to begin, for example input from the user interface indicating that security testing is to begin.

At block 304, the virtual private network server 155 receives a request to establish a VPN connection between the security test system 150 and the access system 114 of the remote network environment 110. The request may be received from the access system 114 in response to the second time indicating the start time for security testing occurs, or within a time before the second time sufficient to allow for the VPN connection to be established and verified prior to the second time, such that security testing may begin at the second time without a delay caused by the establishing of the VPN.

At block 306, the VPN connection is established between the security test system 150 and the access system 114 by the virtual private network server 155. The VPN connection may cause the at least one scan processing unit 165 assigned to perform security testing of the remote networked computing environment to appear as a part of the remote networked computing environment. The at least one scan processing unit 165 appearing as part of the remote networked computing environment may allow the at least one scan processing unit 165 improved access to host devices of the remote networked computing environment, for example by bypassing firewalls and other security measures which would otherwise limit the access an outside device has to the remote networked computing environment.

At decision block 308, the security test system 150 determines whether the remote networked computing environment (e.g., the remote network environment 110) allows dynamic addressing (e.g., manages network connections using a dynamic host configuration protocol (DHCP) server). If the remote networked computing environment manages network IP address assignment using dynamic addressing, the process 300 moves to block 312. Otherwise, if the remote networked computing environment uses static IP assignment, the process 300 moves to block 310.

At block 310, the virtual private network server 155 assigns a static IP address associated with the remote networked computing environment to the security test system 150 or the at least one scan processing unit 165 assigned to perform security testing. The static IP address may be requested from the remote networked computing environment, for example a user may be prompted by a user interface managed by the user interface module 160 to enter one or more available IP addresses. Alternatively, the access system 114, may maintain a listing of one or more IP addresses reserved for security testing. When the static IP address associated with the client network has been assigned to the security test system 150, the process 300 moves to block 316 and ends.

At block 312, the security test system 150, or the access system 114 associated with the remote networked computing environment 110, requests an IP address from the DHCP server of the remote networked computing environment. The requested IP address may be valid for a fixed time, and the time for which the IP address will remain valid may be provided to the security test system 150 so that security testing may be paused, and a new IP address requested at the expiration time.

At block 314, the virtual private network server 155 assigns the requested IP address to the security test system 150, or the at least one scan processing unit 165 assigned to perform the security testing. Assigning the IP address may allow the at least one scan processing unit 165 to appear as if it is a part of the remote networked computing environment, and therefore bypass security systems which would otherwise prevent access required for security testing. When the requested IP address has been assigned to the security test system 150, the process 300 moves to block 316 and ends.

Example Security Testing Process

Figure 4:
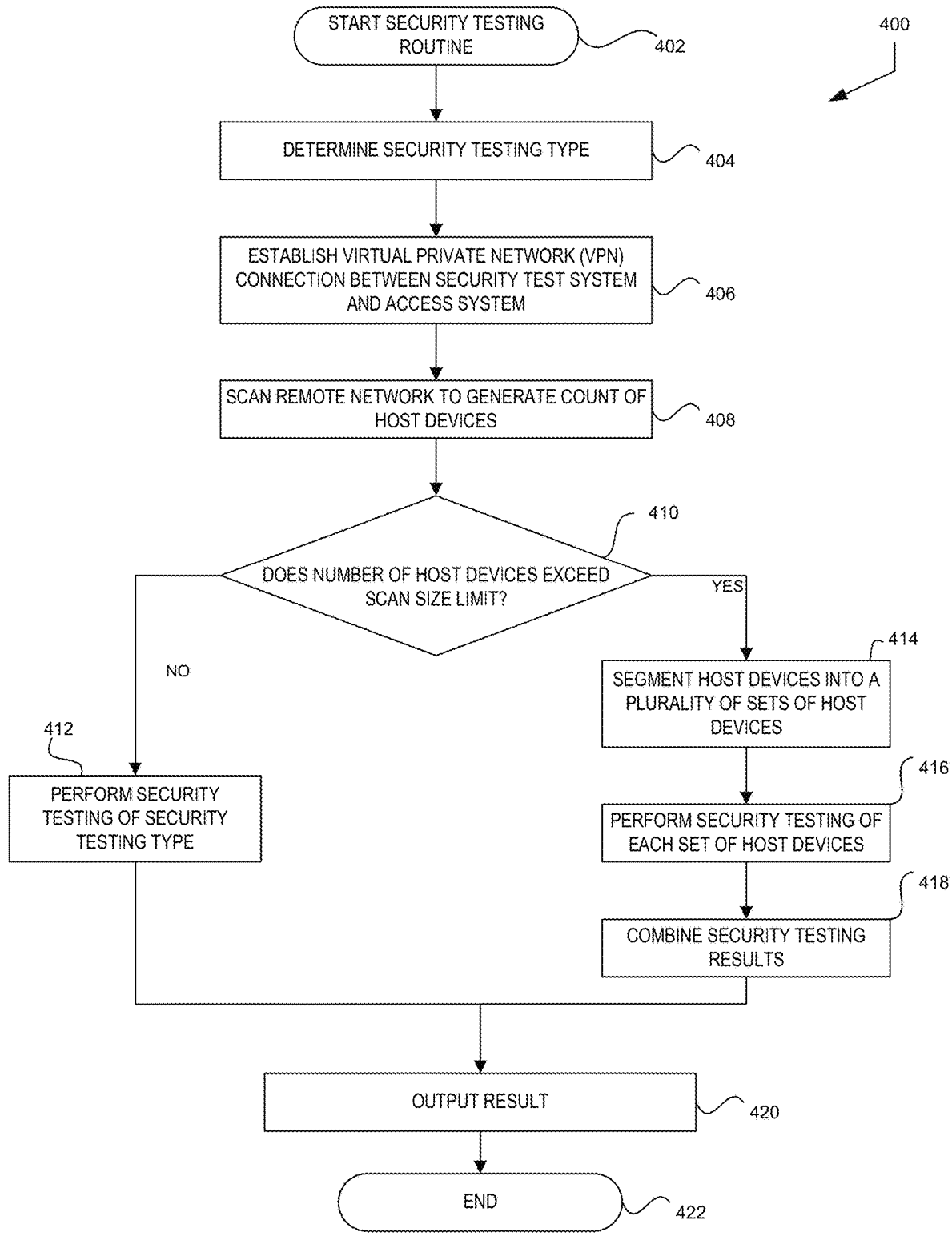
FIG. 4 is a flow diagram of an illustrative routine for conducting security testing based on feedback according to some embodiments.

FIG. 4 illustrates an example process 400 for performing security testing of a remote networked computing environment (e.g., remote network environment 110) using a security test system 150. The process 400 can be implemented by any system that can remotely perform security testing of a networked computing environment (e.g., remote network environment 110). The process 400, in whole or in part, can be implemented, for example, by the security test system 150, the at least one scan processing unit 165, and the like. Although any number of systems, in whole or in part, can implement the process 400, to simplify discussion the process 400 will be described with respect to particular systems.

The process 400 begins at block 402, for example in response to the virtual private network server 155 establishing the VPN connection between the security test system 150 and the access system 114 at the second time.

At block 404, the security test system 150 determines a type of security testing to be performed on the remote networked computing environment. The determination of the type of security testing may be based at least in part on information received in the request to perform the security testing. Examples of security testing can include a vulnerability detection or testing, penetration testing, system configuration testing, attack simulation testing, misconfigured system testing, risk assessment, security code review, and the like. Further, the security testing may include multiple types of testing. Vulnerability testing may include one or more tests to identify security vulnerabilities in the host devices 112. In some cases, vulnerability testing may include checking for open source code and determining whether identified open source code is associated with any known or likely vulnerabilities. Penetration testing may include detecting and exploiting weaknesses in a customer's network configuration and/or host devices connected to the network. Attack simulation testing may include simulating the occurrence of a malicious attack (e.g., a denial-of-service attack) and determining the impact on the remote network computing environment. System configuration testing may include performing one or more tests that determine whether host device 112 are correctly configured or are configured in a manner that is least likely to permit malicious activity and/or that is most likely to protect the confidentiality of data, such as personal identifiable information.

At block 406, the virtual private network server 155 establishes a VPN connection between the security test system 150 and the remote networked computing environment. The establishing of a VPN connection is discussed previously herein in relation to FIG. 3.

At block 408, the access system or the security test system 150 analyze the remote networked computing environment to generate a count of host devices to be scanned. For example, the scanning to generate a count of host devices may be performed by the security test system 150 based on a range of IP addresses provided to the security test system 150 for the purpose of the security testing. Alternatively, the security test system 150 may execute network scanning software (e.g., Nmap) to determine a number of host devices at the first remote network environment 110 networked computing environment Additionally, the security test system 150 may determine a host device type for at least a portion of the host devices during the network scan. Based on the determined host device type, the security test system 150 can determine whether the remote network environment 110 includes devices that may prevent complete security testing from being performed. In cases where devices are detected that may not be conducive to security testing, the security test system 150 may alert a user to the existence of the devices that are not conducive to the security testing. Some non-limiting examples of devices that may not be conducive to security testing may include devices with firmware or outdated software that may crash when security testing is initiated on the devices, routers or other network equipment that operates at reduced network capacity or bandwidth, or a printer that unexpectedly begins printing garbled text. In some embodiments, the security test system 150 may transmit a command to a host device based on identifying the type of host device, the command instructing the host device to enter a state in preparation for security testing.

At decision block 410, the security test system 150 determines whether a number of host devices exceeds a scan size limit. The scan size limit may be a static threshold, a dynamic threshold, or any other indication of a value. A scan size limit may be based on an available number of scan processing units, a time for which a scan processing unit is available, or may be a limit set based on a length of security testing where it would be preferable to either conduct the security testing in parts at multiple times (e.g., the security testing would exceed a time for which the network is available for testing, a longer security test may be more likely to be interrupted or otherwise fail, or a timeframe within which the security testing is requested to be performed would be exceeded). If the number of host devices exceeds the scan size limit, the process 400 moves to block 414. If the number of host devices does not exceed the scan size limit, the process 400 moves to block 412.

At block 412, at least one scan processing unit 165 performs security testing on the remote networked computing environment.

At block 414, the security test system 150 divides the host devices of the remote networked computing environment into a plurality of subsets of host devices, each subset of host devices having a number of host devices below the scan size limit. The security test system 150 may determine host devices assigned to each subset based on an IP address associated with the host device, or a device identifier of the host device (e.g., a MAC address). For example, the security test system 150 may divide the IP range of to undergo security testing into a plurality of blocks of IP addresses, each block of a size less than the scan size limit. Additionally, an estimate of an end time, or security testing completion time, may be updated in response to the division of host devices of the remote networked computing environment into the plurality of subsets of host devices. Further, the estimate of the end time may be determined or adjusted based on a selection of particular test types.

At block 416, at least one scan processing unit 165 performs security testing on each set of the plurality of sets of host devices. In some embodiments, security testing is performed serially, and each set of host devices may undergo security testing individually until all sets of host devices have undergone security testing. For example, a first set of host devices may be tested at a first time, a second set of host devices may be tested at a second time, and so on and so forth. Alternatively, security testing may be performed at least somewhat in parallel. For example, one scan processing unit 165 may perform testing of a first subset of host devices 112 while a second scan processing unit 165 may perform testing of a second subset of host devices 112 at least partially in parallel. Parallel testing may be performed when each of the first subset of host devices and second subset of host devices are in segmented networks. Advantageously, when the first subset of host devices and second subset of host devices are in segmented networks, network traffic information associated with the security testing of the first subset of host devices will not be seen by security testing of the second subset of host devices, thereby reducing a risk of interference occurring between the parallel security tests. Additionally, the segmented network containing the first subset of host devices and the segmented network containing the second subset of host devices may share a single access system (e.g., access system 114) thereby reducing the resources required to perform security testing of the two segmented networks. The access system may, in some embodiments, be used to assist in segmenting one network into two or more segmented networks.

Where security testing would exceed a timeframe in which security testing is desirable (e.g., where security testing is requested to be performed outside business hours), the scheduling coordinator 170 may schedule security testing of the plurality of sets of host devices to be performed such that security testing occurs during a desired timeframe. For example, the scheduling coordinator 170 may schedule security testing of a first set of host devices for a first timeframe, and schedule security testing of a second set of host devices for a second timeframe. In some such cases, both the first set of host devices and the second set of host devices may be part of the plurality of sets of host devices. Further, the first timeframe and the second timeframe may be selected to be within the desired timeframe.

At block 418, the security test system 150 combines the results of security testing of each set of host devices of the plurality of sets of host devices into a single security testing result. The single security testing result may appear, when reviewed by a user, as if all host devices underwent security testing at a same time, masking the division of the host devices into the plurality of sets of host devices from the reviewing user.

At block 420, the security test system 150 outputs security testing results, for example via the user interface module 160. When the result of the security testing has been output, the process 400 moves to block 422 and ends.

Execution Environment

FIG. 5 illustrates various components of an example computing device 500 configured to implement various functionality described herein.

In some embodiments, the security test system 150 may be implemented using any of a variety of computing devices, such as server computing devices, desktop computing devices, personal computing devices, mobile computing devices, mainframe computing devices, midrange computing devices, host computing devices, or some combination thereof.

In some embodiments, the features and services provided by the computing device 500 may be implemented as web services consumable via one or more communication networks. In further embodiments, the security test system 150 is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

In some embodiments, as shown, a the security test system 150 may include: one or more computer processors 502, such as physical central processing units ("CPUs"); one or more network interfaces 504, such as a network interface cards ("NICs"); one or more computer readable medium drives 506, such as a high density disk ("HDDs"), solid state drives ("SSDs"), flash drives, and/or other persistent non-transitory computer readable media; one or more input/output device interfaces 508; and one or more computer-readable memories 510, such as random access memory ("RAM") and/or other volatile non-transitory computer readable media.

The computer-readable memory 510 may include computer program instructions that one or more computer processors 502 execute and/or data that the one or more computer processors 502 use in order to implement one or more embodiments. For example, the computer-readable memory 510 can store an operating system 512 to provide general administration of the security test system 150. As another example, the computer readable memory 510 can store security test engine 514 for performing security testing of a remote networked computing environment.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design conditions imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A security testing system configured to implement security testing of a set of host devices in a remote networked environment, the security testing system comprising:
   a network interface system configured to establish a communication channel with an access system at the remote networked environment;
   a plurality of scan processing units, wherein each of the plurality of scan processing units is implemented by a hardware processor and is configured to implement at least a portion of the security testing of the set of host devices at the remote networked environment; and
   a controller configured to:
      receive a request from a computing system to perform security testing of the remote networked environment at a first time;
      use the network interface system to establish the communication channel with the access system;
      receive an indication that the access system is available;
      determine a number of host devices included in the set of host devices;
      determine a number of pending host devices that are awaiting security testing at the first time, wherein the pending host devices comprise host devices at one or more remote networked environments that are separate from the remote networked environment;

determine an available number of scan processing units from the plurality of scan processing units at the first time;

schedule the security testing of the set of host devices at a second time based at least in part on the number of host devices included in the set of host devices, the number of pending host devices, and an availability of a scan processing unit, wherein the second time is later than the first time and comprises an estimated start time for security testing the set of host devices, and wherein scheduling the security testing of the set of host devices at the second time is further based on a type of the security testing, a priority of the security testing, a priority of the remote networked environment, a priority of an entity associated with the remote networked environment, or an estimated testing time for completing the security testing;

output the estimated start time to the computing system;

at the second time, establish a virtual private network connection to the access system, wherein the virtual private network connection provides a scan processing unit of the plurality of scan processing units with access to the set of host devices at the remote networked environment;

initiate the security testing of the set of host devices over the virtual private network connection using the scan processing unit;

identify a conflict application executing on a host device of the set of host devices, wherein the conflict application comprises an application that interferes with performance of the security testing; and cause a modification in an operating state of the conflict application.

2. The security testing system of claim 1, wherein the access system comprises a headless client that is connected to network hardware at the remote networked environment.

3. The security testing system of claim 1, wherein the access system comprises a special purpose computing system.

4. The security testing system of claim 1, wherein the access system comprises a computing system within the remote networked environment configured to execute remote connection software to connect with the security testing system.

5. The security testing system of claim 1, wherein the security testing comprises penetration testing, vulnerability testing, misconfigured system testing, attack simulation testing, or any combination thereof.

6. The security testing system of claim 1, wherein the set of host devices comprises one or more computing systems, one or more instances of network hardware, one or more printers, one or more internet protocol phones, one or more Internet-of-Things (IOT) devices, or one or more internet protocol manufacturing devices.

7. The security testing system of claim 1, wherein at least one of the plurality of scan processing units comprises a graphics processing unit, a central processing unit, a task accelerator, or a virtual machine.

8. The security testing system of claim 1, wherein the computing system is the access system.

9. The security testing system of claim 1, wherein the computing system is a host device at the remote networked environment.

10. The security testing system of claim 1, wherein the computing system is external to the remote networked environment.

11. The security testing system of claim 1, wherein the control system is further configured to determine the number of host devices by causing a scan processing unit of the plurality of scan processing units to perform a network scan of the remote networked environment to identify the number of host devices included in the set of host devices.

12. The security testing system of claim 11, wherein the network scan further comprises determining an identity of host type for each of the host devices included in the set of host devices.

13. The security testing system of claim 1, wherein the control system is further configured to output an estimated completion time for the security testing.

14. The security testing system of claim 1, wherein the virtual private network connection is established by the scan processing unit selected by the control system.

15. The security testing system of claim 1, wherein the control system is further configured to:
receive an indication of an available network address at the remote networked environment; and
assign the available network address to the scan processing unit.

16. The security testing system of claim 1, wherein the control system is further configured to identify a host device of the set of host devices to be excluded from the security testing.

17. The security testing system of claim 16, wherein the control system is further configured to cause a modification to an operating state of the host device to be excluded from the security testing.

18. The security testing system of claim 1, wherein, in response to the number of host devices included in the set of host devices exceeding a threshold, the control system is further configured to divide the set of host devices into a plurality of subsets of host devices.

19. The security testing system of claim 18, wherein initiating the security testing of the set of host devices comprises initiating the security testing of a first subset of host devices of the plurality of subsets of host devices.

20. The security testing system of claim 19, wherein the control system is further configured to initiate security testing of a second subset of host devices of the plurality of subsets of host devices.

21. The security testing system of claim 20, wherein the control system initiates the security testing of the second subset of host devices at a third time that is later than the second time.

22. The security testing system of claim 21, wherein the control system initiates the security testing of the second subset of host devices using the scan processing unit.

23. The security testing system of claim 20, wherein the control system initiates the security testing of the second subset of host devices using a second scan processing unit.

\* \* \* \* \*